Aug. 16, 1932.  W. A. GIBBS  1,871,510

ANIMAL TRAP

Filed Oct. 24, 1930  3 Sheets-Sheet 1

Inventor:
Walter A Gibbs
by his Attorneys
Howson & Howson

Aug. 16, 1932.  W. A. GIBBS  1,871,510
ANIMAL TRAP
Filed Oct. 24, 1930   3 Sheets-Sheet 2

Inventor:
Walter A Gibbs
by his Attorneys
Harrison & Howson

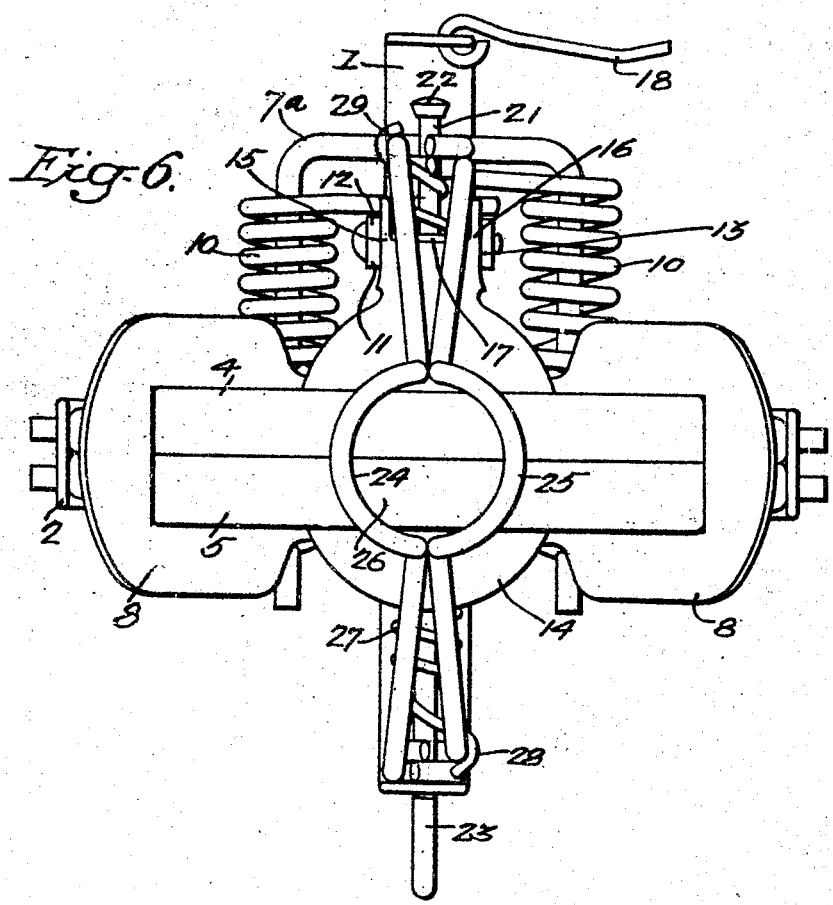

Patented Aug. 16, 1932

1,871,510

UNITED STATES PATENT OFFICE

WALTER A. GIBBS, OF CHESTER, PENNSYLVANIA

ANIMAL TRAP

Application filed October 24, 1930. Serial No. 490,982.

This invention relates to improvements in animal traps, and particularly to steel traps having jaws which are adapted to grip a leg of the animal caught. The invention has for its object the provision in such traps of a feature whereby the breaking of the animal's leg is prevented.

Animals caught in steel traps frequently break the leg caught in the trap by threshing around after being caught. This is very objectionable because they frequently escape after the leg is broken. The liability of the leg being broken may be greatly reduced and substantially eliminated by providing means above the gripping point of the jaws to brace the leg, and thereby prevent strain at the point where the leg is gripped. The present invention provides such means, and the principles thereof may be adapted to any animal trap of the type indicated.

The invention will be more clearly understood from the following detailed description in connection with the accompanying drawing which discloses several embodiments of the invention.

In the drawing:

Fig. 6 is a plan view of the device of Fig. 4.

Figure 1:
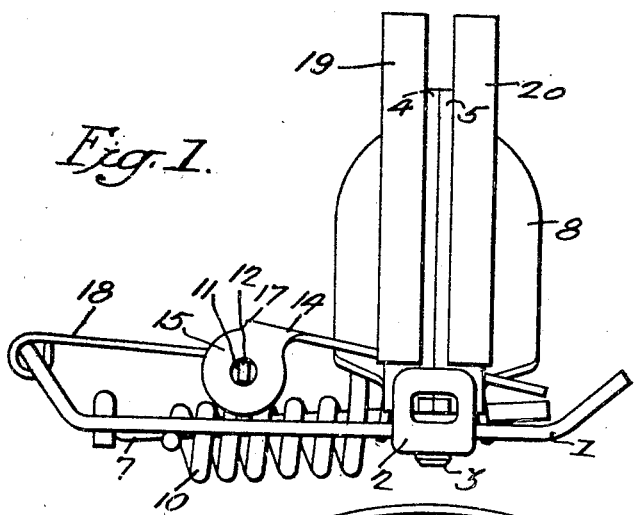
Fig. 1 is an end view in elevation of a device constructed in accordance with the invention.
Figure 2:
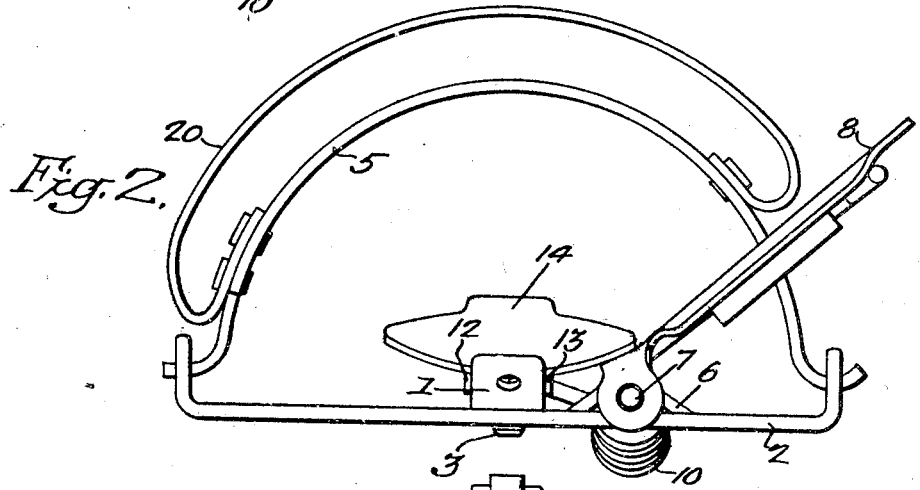
Fig. 2 is a side view in elevation of the device of Fig. 1.
Figure 3:
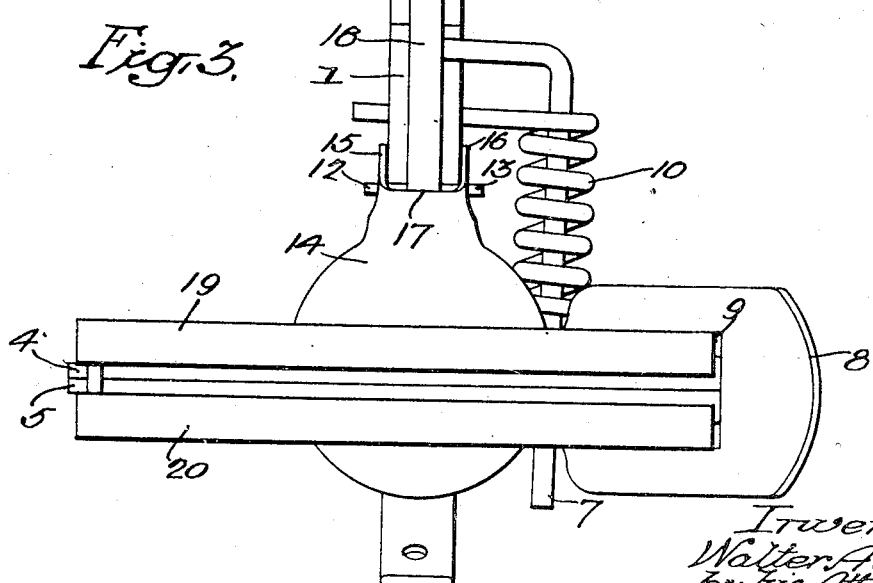
Fig. 3 is a plan view of the device of Fig. 1.

Referring to Figs. 1 to 3, the device disclosed therein comprises a base member 1 which may take the form of a strip of metal having its ends up-turned. A second base member 2 having the same general form as base 1 is disposed at right angles to base 1, and the two are fastened at their intersection in any suitable manner, such as by means of rivet 3. The up-turned ends of base 2 are each provided with a pair of apertures adapted to receive the curved ends of the jaws of the trap. The jaws 4 and 5 may comprise a pair of steel strips curved as shown and having their ends tapered so that they may be inserted in the openings provided in base 2. These jaws, as will be apparent, are adapted to pivotally rotate, the ends of base 2 serving as the pivot point.

Base 2 has a portion 6 thereof cut and raised to provide an opening through which rod 7 is inserted. As clearly shown in Fig. 3, this rod takes the form of a right-angle member, having one arm held by base 2 and the other arm hooked to pass through an aperture in base 1. A yoke member 8 has its lower portion formed to provide a pair of apertured wings for pivotally mounting the same upon rod 7. This yoke has an opening 9 therein sufficiently large to enclose the jaws of the trap and the brace members to be described later. A coil spring 10 is wound about rod 7, and has one end thereof extending beneath base 1, while its other end engages the lower surface of yoke 8, as clearly shown in Fig. 2. This spring tends to urge the yoke upward to thereby force the jaws of the trap together, as will be more apparent hereinafter.

Base 1 has attached thereto an upright 11 which is formed to provide shoulders 12 and 13. A treadle 14 has one end thereof formed to provide depending apertured wings 15 and 16 for receiving the extending shoulders 12 and 13. The treadle is, therefore, pivotally mounted upon support 11. The rear portion 17 of the treadle serves as a catch for latching a tongue or trigger 18 when the trap is set. This trigger may comprise a single strip of metal having one end curved and passing through an opening in the end of base 1, as clearly shown in Fig. 1.

Thus far, the description has clearly set forth the details of construction of a steel trap. Such a trap, however, has the above-mentioned objectionable feature that the animal frequently breaks its leg and may escape. In accordance with my invention, I incorporate in the disclosed trap, one form of a device which serves as a brace for the gripped leg to prevent breaking of the same. In the present instance, this device takes the form of a pair of metal strips 19 and 20 having the same curvature as the jaws of the trap, and having their ends bent in the manner shown in Fig. 2. One of these strips is mounted upon each of the jaws of the trap, and the ends thereof are fastened to the jaws in any suitable manner, such as by means of rivets.

To set the trap disclosed, it is merely necessary to force yoke 8 downward against the action of spring 10 and separate the jaws of the trap. Trigger 18 may then be placed over the adjacent jaw and latched in place under treadle 14. It will be apparent that if an animal steps upon or disturbes the treadle, trigger 18 will be released, thereby allowing spring 10 to forcibly close the jaws of the trap through the medium of yoke 8. When the jaws of the trap are closed, sufficient space remains between strips 19 and 20 so that the leg gripped by the jaws is firmly braced by these strips. Since the strips are disposed so as to brace the leg at a substantial height above the point at which it is gripped by the jaws, the strain which would otherwise be imposed upon the gripped leg, due to the threshing about of the animal in its efforts to escape, is eliminated.

Figure 4:
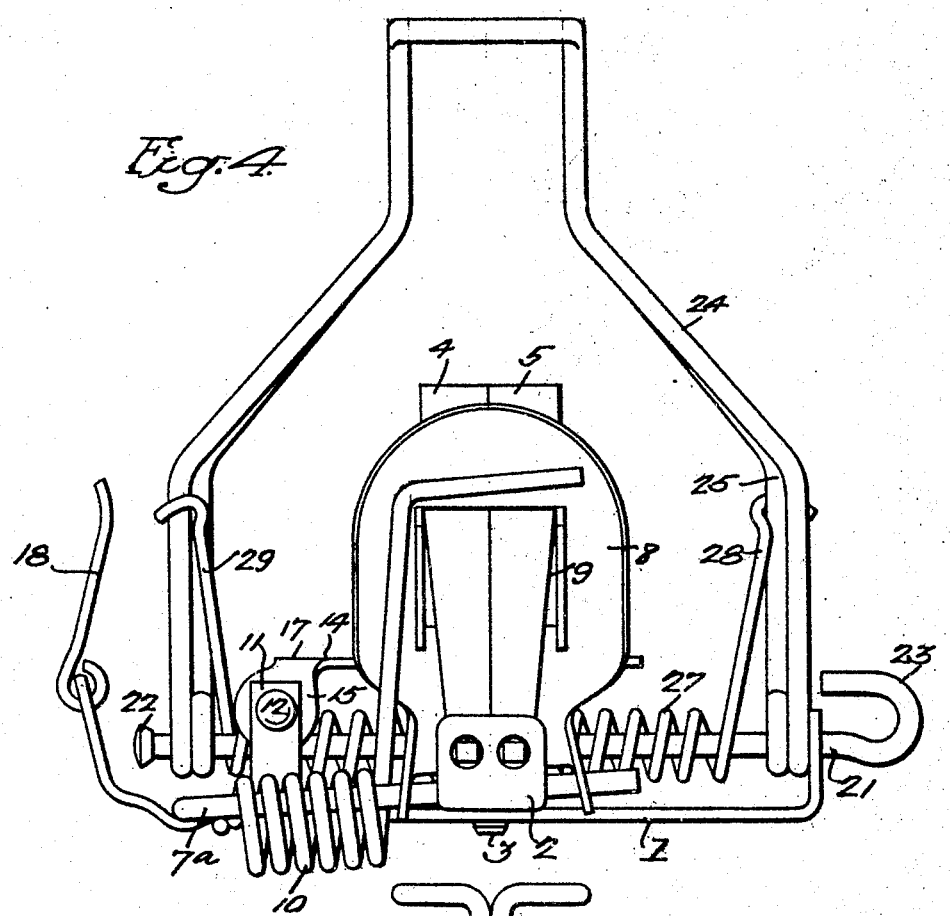
Fig. 4 is an end elevational view of a modified form of the device constructed in accordance with the invention.
Figure 5:
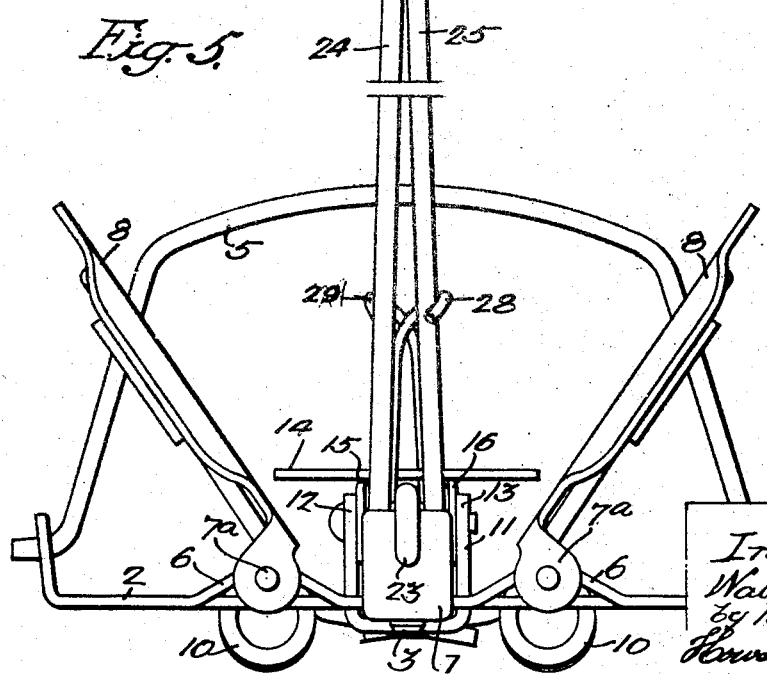
Fig. 5 is a view in side elevation of the device of Fig. 4.

In Figs. 4 to 6, I have shown a modified form of my device. The trap disclosed in these figures is similar in construction to that disclosed in Figs. 1 to 3, like parts being numbered alike, except that a pair of yokes 8 are provided instead of a single yoke. Base 2 has a pair of cut and raised portions 6 to provide for the pair yokes. Likewise, a pair of springs 10 are provided, one for each yoke and tending to force the same upward to close the jaws of the trap. Instead of having a pair of rods 7 to pivotally mount the yokes on the base and to carry springs 10, a single U-shaped rod 7a may be used, as clearly illustrated Fig. 6. Otherwise, the trap, per se, in this modified form of the device is exactly similar in construction to the trap of Figs. 1 to 3.

In this form of the device, a rod 21 is disposed in parallel relation with and above base 1, and passes through an aperture in one end of base 1. This rod has an enlarged head 22 at one end, and its opposite end is hook-shaped as at 23. A two-part brace comprising members 24 and 25 is provided, the said members having their ends formed so as to encircle rod 21 to pivotally mount the members on the rod. The brace members may each be formed of a single piece of heavy wire, or the like, bent in the manner clearly illustrated on the drawing to provide a circular brace portion 26 when the parts are in closed position. A coil spring 27 is wound about rod 21, and has one end 28 thereof hooked about one member of the brace, while the other end 29 of the spring is hooked about the other member of the brace. It will be apparent that spring 27 will tend to force the clamping members of the brace together.

Assuming that the device is to be set, the following procedure is followed. The clamping members 24 and 25 of the brace are forced apart against the action of spring 27 until they lie in a horizontal plane. The yokes 8 are then forced downward against the action of their springs to a horizontal position. The jaws of the trap may then be forced apart, and it will be noted that they will rest against the parts of the brace and hold the brace open. Trigger 18 may then be placed over the adjacent jaw of the trap and latched beneath the treadle. The trap is now in set position, both the jaws of the trap and the members of the brace lying horizontally disposed. Should an animal step upon or otherwise disturb the treadle, the trigger will, of course, be released and allow the springs to force both jaws of the trap and the clamp members together. Since the clamping portion 26 of the brace will firmly encircle the leg of the animal gripped by the trap at a substantial distance above the gripping point, the strain which would otherwise be exerted upon the animal's leg at that point will be eliminated. Therefore, any tendency for the leg to break, as previously pointed out, will be eliminated.

It will be apparent that a device constructed in accordance with my invention may be simple in construction and easily operated. Such a device eliminates entirely the inherent defect in prior art devices of this nature. Obviously, changes in the details of construction of the device may be made without departing from the spirit and scope of the invention. It is to be understood, therefore, that such changes as are within the scope of the appended claims are contemplated and may be made.

I claim:

1. In an animal trap, a pair of jaws for gripping a leg of the animal caught, means comprising a brace formed to encircle the said leg at a substantial distance from the gripping point to brace the same and prevent breaking thereof at the gripping point, and common means for rendering said jaws and said first means inoperative until said trap is sprung.

2. In an animal trap, a pair of jaws for gripping a leg of the animal caught, means comprising a brace for bracing the said leg at a substantial distance from the gripping point to prevent breaking thereof at the gripping point, said brace being self-adjustable with respect to said jaws to brace the leg in any position, and common means for rendering said jaws and said first-means inoperative until said trap is sprung.

3. In an animal trap, a pair of jaws for gripping a leg of the animal caught, means independent of said jaws for bracing the said leg at a substantial distance from the gripping point to prevent breaking thereof at the gripping point, and common means for rendering said jaws and said first means inoperative until said trap is sprung.

4. In an animal trap, a pair of jaws for gripping a leg of the animal caught, a two-part brace for bracing the said leg at a substantial distance from the gripping point to prevent breaking thereof at the gripping point, said brace being independent of said jaws and self-adjustable with respect thereto, and a latch for holding said jaws and said brace open until said trap is sprung.

5. In an animal trap, a pair of jaws for gripping a leg of the animal caught, a two-part brace transversely straddling said jaws for bracing the said leg at a substantial distance from the gripping point to prevent breaking thereof at the gripping point, and a latch for holding said jaws and said brace open until said trap is sprung.

6. In an animal trap, a pair of jaws for gripping a leg of the animal caught, a brace comprising a pair of jaws disposed at an angle to said gripping jaws for bracing the said leg at a substantial distance from the gripping point to prevent breaking thereof at the gripping point, and means for holding said pairs of jaws open until the trap is sprung.

7. In an animal trap, a pair of jaws for gripping a leg of the animal caught, a brace comprising a pair of jaws transversely straddling said gripping jaws for bracing the said leg at a substantial distance from the gripping point to prevent breaking thereof at the gripping point, said second-mentioned jaws being engageable by said gripping jaws to hold them open, and a latch for holding said gripping jaws open until the trap is sprung.

WALTER A. GIBBS.